Sept. 17, 1957 J. H. EMERSON Re. 24,357

CHEST RESPIRATOR

Original Filed Dec. 18, 1953

Inventor,
John H. Emerson,
by Dike, Thompson & Sanborn,
Att'ys.

United States Patent Office

Re. 24,357
Reissued Sept. 17, 1957

24,357

CHEST RESPIRATOR

John H. Emerson, Arlington, Mass.

Original No. 2,707,948, dated May 10, 1955, Serial No. 398,975, December 18, 1953. Application for reissue May 8, 1957, Serial No. 658,905

7 Claims. (Cl. 128—30)

Matter enclosed in heavy brackets [ ] appears in the original patent but forms no part of this reissue specification; matter printed in italics indicates the additions made by reissue.

The present invention relates to chest respirators for producing artificial respiration in a patient.

An object of the present invention is to provide a light, portable, low-cost chest respirator, which is easily applied to and removed from a patient, and the shape of which is adapted to be easily adjusted by hand to fit patients having a variety of chest sizes and shapes.

A further object is to provide such a resiprator which will afford the patient a maximum of convenience, comfort and freedom of movement, and which, during alternate pressure periods, does not exert any substantial pressure against any part of the patient's body.

Other and further objects and advantages of the present invention will be apparent from the following description and by reference to the accompanying drawings, wherein.

Figure 3:
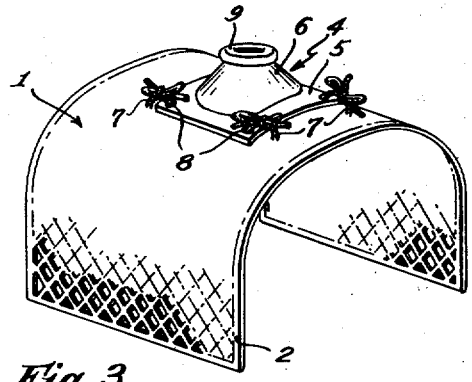
Fig. 3 is a perspective of the cage portion of the respirator shown in Figs. 1 and 2.
Figure 4:
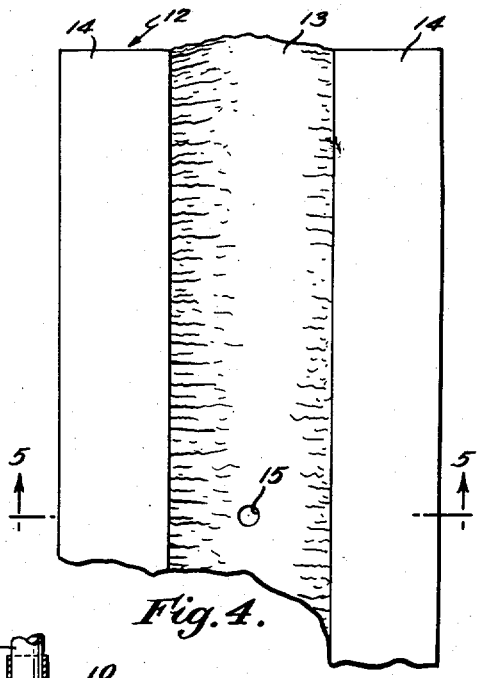
Fig. 4 is a top view of the flexible sheet which forms the outer wall of the respirator shown in Figs. 1 and 2.
Figure 5:
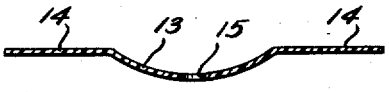
Fig. 5 is a section taken on the line 5—5 of Fig. 4.
Figure 1:
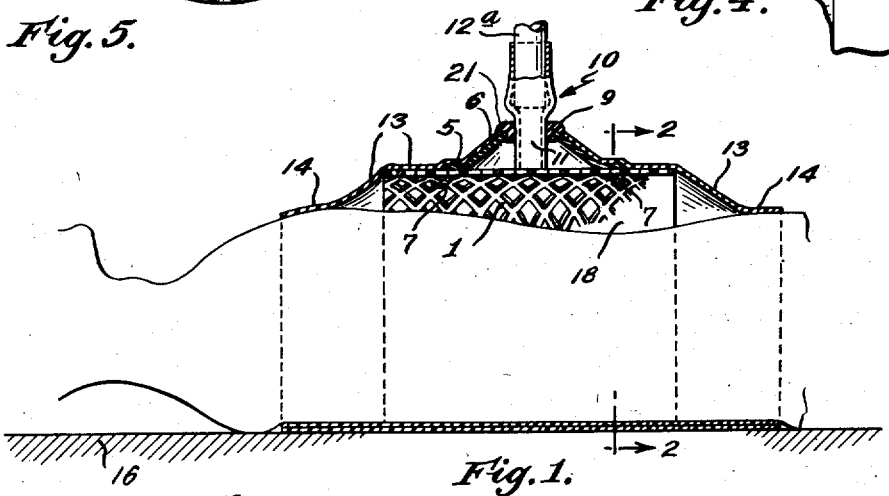
Figure 1 is a longitudinal section of a respirator embodying the present invention applied to a patient who is resting upon a support.
Figure 2:
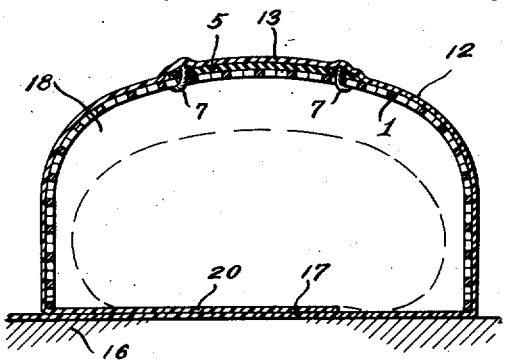
Fig. 2 is a section taken on the line 2—2 of Fig. 1.

Referring to Figs. 1 to 5, the chest respirator of the present invention comprises a rigid but malleable cage or shield 1 which is generally U-shaped in cross section and is adapted to be positioned in spaced relationship to the patient's chest and sides, as shown in Figs. 1 and 2. The cage 1 is preferably made of expanded metal, dipped in Vinylite or other plastic material so as to cover any sharp edges of the metal. The cage 1 is malleable, and may be bent by an attendant to any cross sectional shape so it will fit the size of the patient to be treated, and be spaced from his body as shown in Figs. 1 and 2. For example a minimum of two inches may be provided above his chest and three quarters of an inch at each side. Any type of malleable material may be used for the case, but expanded metal is preferred because it is cheap. A border 2 having a plastic coating surrounds the edges of the expanded metal cage proper. The plastic coating may be omitted, if desired.

The pad 4, comprises a piece of rigid material such as rigid plastic, metal or wood, having a hollow conical portion 6, the lower, larger end of which extends into flanges 5 having bottom surfaces which fit the contour of the top of cage 1. This pad is adapted to be attached to the top of cage 1 as shown, by means of strings 7 passing through holes 8 in each corner of flange portion 5 and thence around an expanded metal strand of the cage 1. Although the use of strings is shown, the pad 4 may be attached to the top of cage 1 in the position shown in any manner desired.

A rubber grommet 9 is attached to the edge of the perforation which is provided at the center of the top of the hollow conical portion 6 by means of the groove

21 in the outer face of the grommet, the edge of the perforation extending into said groove, as shown in Fig. 1.

The lower portion 11 of the rigid tube 10 is adapted to be snugly received by the grommet 9 in an air-tight manner. The hose 12a has one end secured to the tube 10 and the other end adapted to be connected to any conventional means for creating alternating negative and atmospheric or positive pressures.

The sheet 12 may be made from any light, flexible air impervious material, such as a thin, vinyl plastic sheet. In the preferred embodiment, the middle portion 13 of the sheet is stretched longitudinally of the sheet and the two unstretched portions 14 extend longitudinally at opposite sides thereof. A perforation or passage 15 is provided at approximately the center of sheet 12.

In use the patient is placed upon his back upon a support 16, for example, a bed. The cage 1 is then positioned over the patient's chest, as shown, with its longitudinal edges resting upon the patient support 16, and preferably with no part of the cage contacting the patient's body. The sheet 12 is then spread over the cage 1 with the perforation 15 axially aligned with the opening in the grommet 9 with one unstretched side portion 14 extending from one end of the cage toward the patient's head and the opposite unstretched side portion 14 extending from the oposite end of the cage toward the patient's feet, and the stretched portion 13 fitting over the cage proper. The ends 20 and 17 of the sheet then lie loosely upon the patient support at opposite sides of the cage. The edge of the perforation 15 of the sheet is then placed so as to register with or about the periphery of the grommet 9 as shown in Fig. 1. The end 20 of the sheet is then passed under the adjacent longitudinal edge of the cage and tucked between the patient's back and the patient support and then the other end 17 of the sheet is similarly arranged as in Figs. 1 and 2. With both ends of the sheet tucked between the patient and the patient support in the manner shown, two smooth layers of plastic are provided between the patient's back and the support. However, the number of folds or layers between the patient's back and the support is not critical so long as a substantially air-tight chamber 18 is provided between the patient and the sheet 12.

After the sheet 12 has been arranged over cage 1 and under the patient, as described, the tube 11 is inserted in the passage in the grommet 9 and the means for creating alternating periods of negative and atmospheric or positive pressure is turned on.

When a period of negative pressure is thus created in the chamber 18, the unstretched side portions 14 of the flexible plastic sheet 12, which contact the patient's body at opposite sides of the cage, are sucked even more slightly against the patient's body and their flexibility permits them to readily contact the surface of the patient's body, thereby insuring a substantially air-tight seal. Furthermore, the edges of hole 15 are sucked tightly against the exterior surface of portion 6 and grommet 9 so as to prevent the entrance of air into the cage interior 18. The chamber 18 remains substantially air-tight during the ensuing period of atmospheric or positive pressure. Consequently an inhalation is induced during each period of negative pressure and an exhalation during each period of atmospheric or positive pressure. When positive pressure of sufficient intensity is used, it has been found to be desirable to use elastic bands along the longitudinal sides 14 of the sheet to hold the edges against the patient's body and prevent leakage during periods of positive pressure.

It will be observed that no rigid portion of the respirator presses against the patient's body at any time during operation. The external pressure created during periods of negative pressure is applied to the top of the cage from whence it is transferred to the longitudinal edges of the cage and thence to the bed or support.

The apparatus is inexpensive to manufacture, readily portable and may be easily and quickly applied to the patient, whether in a hospital or in the field. In the field the patient may be supported on the ground.

Although the sheet 12 has been described as having a stretched middle portion, this is not essential to the present invention and an unstretched flexible sheet may be used. Furthermore, the longitudinal sides 14 of the sheet may be folded one or more times upon the patient's body before the ends 20 and 17 are tucked beneath the patient.

The important characteristics of the sheet 12 are that it be made of air impervious material which is sufficiently flexible that it will readily conform to the contour of the patient's body.

The respirator of this invention is readily convertible to one which may be used by an ambulatory patient. This is done by supplying a flat backing plate of expanded metal or other material which is large enough to bridge the gap between the longitudinal edges of the U-shaped cage 1 and by detachably securing said longitudinal edges to the backing plate, for example, with strings passing through holes in the cage and the backing plate. In use this backing plate is adjacent to the patient's back and the cage extends forwardly from the backing plate with its legs adjacent to the patient's sides and the forward part bridging the patient's chest. The sheet 12 is then wrapped about the respirator and the patient as described above, thus enclosing both the backing plate and the cage to form a chamber about the patient's chest like the chamber 18. Strings or elastic bands encircling the side portions 14 of the sheet 12 may be used to detachably hold said side portions in contact with the patient. By carrying the device which creates the variations in pressure, the patient may walk about and if he desires he may recline on a bed without removing the backing plate which then rests upon the bed. Instead of strings for detachably securing the backing plate to the legs of the cage, the backing plate may be provided with flanges at its longitudinal sides and the longitudinal edges of the cage may be bent outwardly to engage the inner sides of the flanges, thus detachably securing the cage to the backing plate by the friction between the flanges and the longitudinal edges of the cage.

In the foregoing description and the annexed claims the device has been referred to as a "chest respirator." It is operative if it encloses the lower part of the patient's chest and none of his abdomen. It is also operative if it encloses the patient's abdomen and none of his chest. It is also operative, and is believed to be most effective, if it encloses the lower part of the patient's chest and the upper part of his abdomen. The words "chest respirator" are used in the art to include a respirator capable of use in any and all of these positions and those words are used with the same scope in this specification and in the claims.

While I have shown and described one embodiment of my invention, it is to be understood that this disclosure is for the purposes of illustration only and various changes and substitutions of equivalent elements may be made without departing from the spirit and scope of the invention as set forth in the appended claims.

I claim:

1. A respirator comprising a trough-like cage in cross section adapted to be positioned over the trunk of a patient resting against a support with its longitudinal edges resting against said support, one at each side of the patient, a sheet of flexible, air impervious material adapted to be placed over the outside surface of said cage, said sheet being of such a width that when it is placed over said cage, and said cage is positioned over the patient's trunk while the patient is resting against said support, one side of said sheet will extend from the adjacent end of the cage toward the patient's head a sufficient distance so that a substantial portion of said sheet will rest against the adjacent portion of the patient's body, and the opposite side of said sheet will extend from the opposite end of the cage towards the patient's feet a sufficient distance, so that a substantial portion of said sheet will rest against the adjacent portion of the patient's body, said sheet being of a length sufficiently longer than said cage, so that each end of said sheet may be folded under the adjacent edge of the cage and tucked between the patient and said support, thereby to form a substantially air-tight chamber about the patient's trunk, a passage extending through the sheet and adapted to provide communication between the interior and exterior of said chamber.

2. The apparatus of claim 1, wherein said cage comprises a rigid, malleable material, adapted to be bent by hand to change the cross sectional shape of the cage to accommodate the cage to the size of the patient being treated.

3. The apparatus of claim 1, wherein said cage comprises expanded metal.

4. The apparatus of claim 1, wherein the middle portion of said sheet has been enlarged by stretching it, and the sides of said sheet which are to rest against the patient's body are unstretched.

5. The apparatus of claim 1, also comprising a hollow cone shaped pad having flanges adapted to rest upon the outer surface of said cage, and a passage at the upper portion of the cone, the passage in said sheet being concentric with the passage in said cone when the sheet is assembled with the cage.

6. The apparatus of claim 5 wherein the passage in the cone shaped pad is formed by a resilient grommet which is adapted to detachably hold a hose connection.

*7. A respirator comprising a trough-like cage in cross section adapted to be positioned over the trunk of a patient resting against a support with its longitudinal edges resting against said support, one at each side of the patient, a sheet of flexible, air impervious material adapted to be placed over the outside surface of said cage, said sheet being of such a width that when it is placed over said cage, and said cage is positioned over the patient's trunk while the patient is resting against said support, one side of said sheet will extend from the adjacent end of the cage toward the patient's head a sufficient distance so that a substantial portion of said sheet will rest against the adjacent portion of the patient's body, and the opposite side of said sheet will extend from the opposite end of the cage towards the patient's feet a sufficient distance, so that a substantial portion of said sheet will rest against the adjacent portion of the patient's body, said sheet being of a length sufficiently longer than said cage, so that it may extend under each adjacent edge of the cage and between the patient and said support, thereby to form a substantially air-tight chamber about the patient's trunk, a passage extending through the sheet and adapted to provide communication between the interior and exterior of said chamber.*

References Cited in the file of this patent or the original patent

UNITED STATES PATENTS

| | | |
|---|---|---|
| 2,065,982 | Nordin | Dec. 29, 1936 |
| 2,223,570 | McMillin | Dec. 3, 1940 |
| 2,309,470 | McCollam | Jan. 26, 1943 |